March 12, 1946. S. SMITH ET AL 2,396,539
PRESSURE INTENSIFYING MECHANISM
Filed Dec. 6, 1943 5 Sheets-Sheet 5

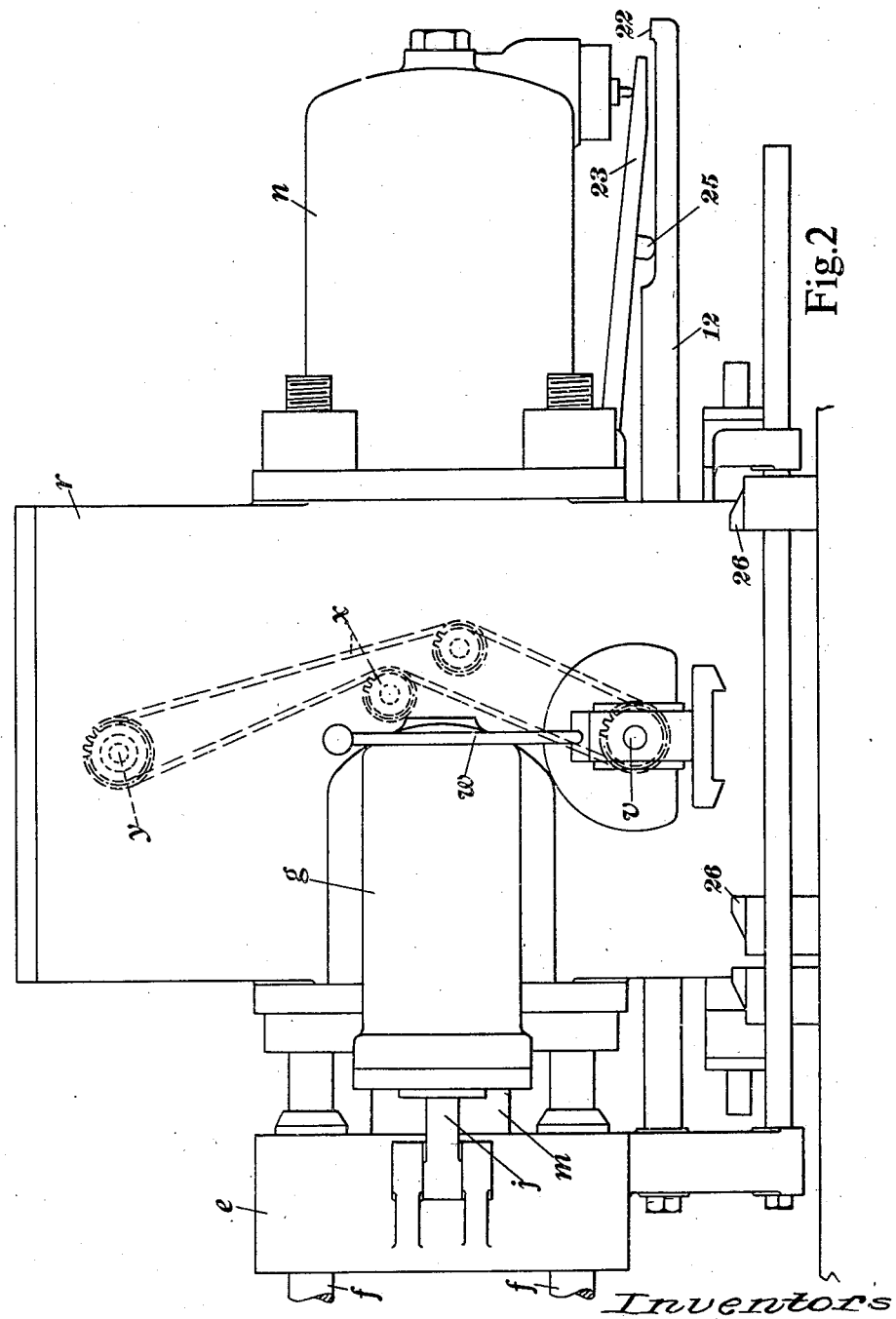

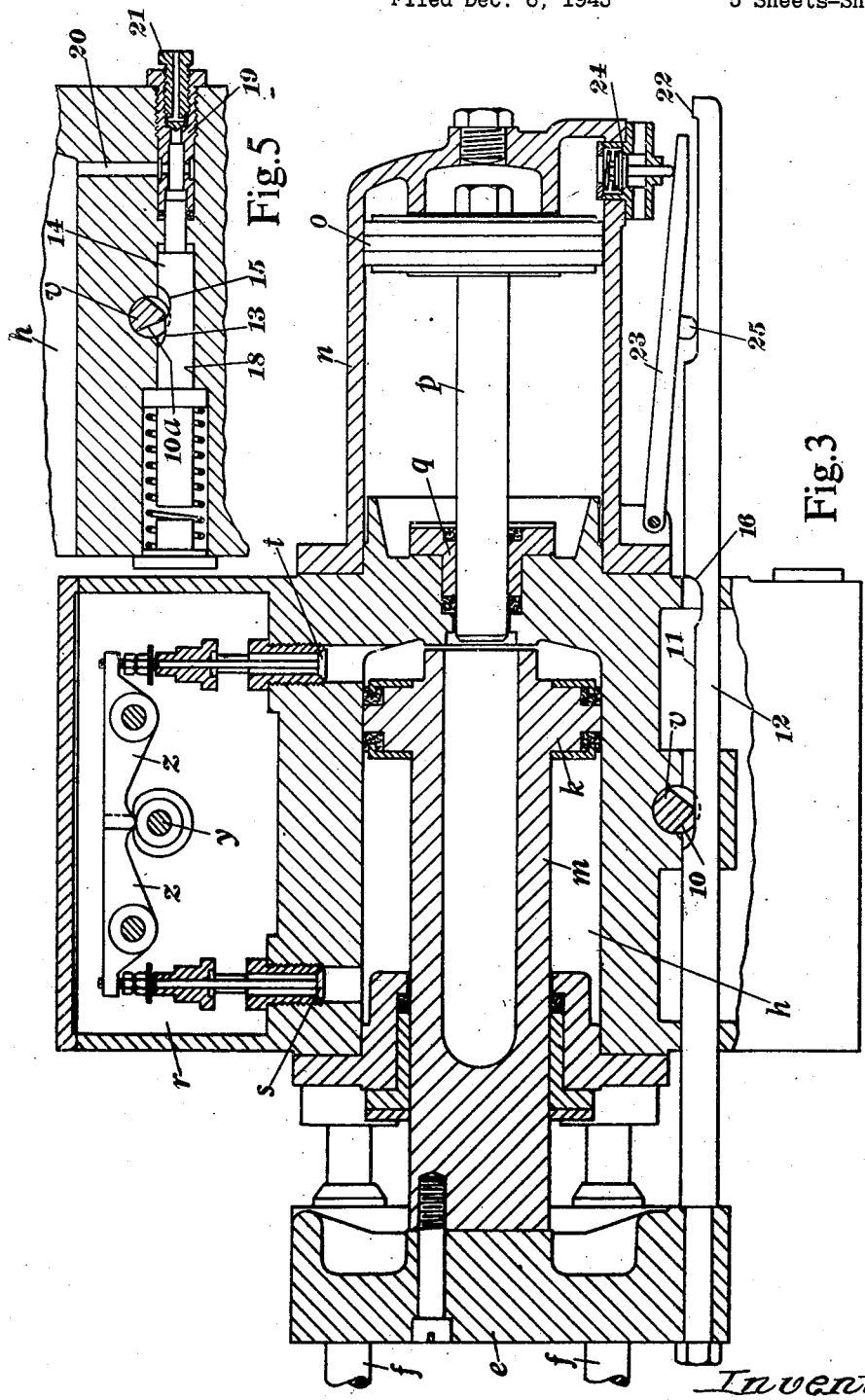

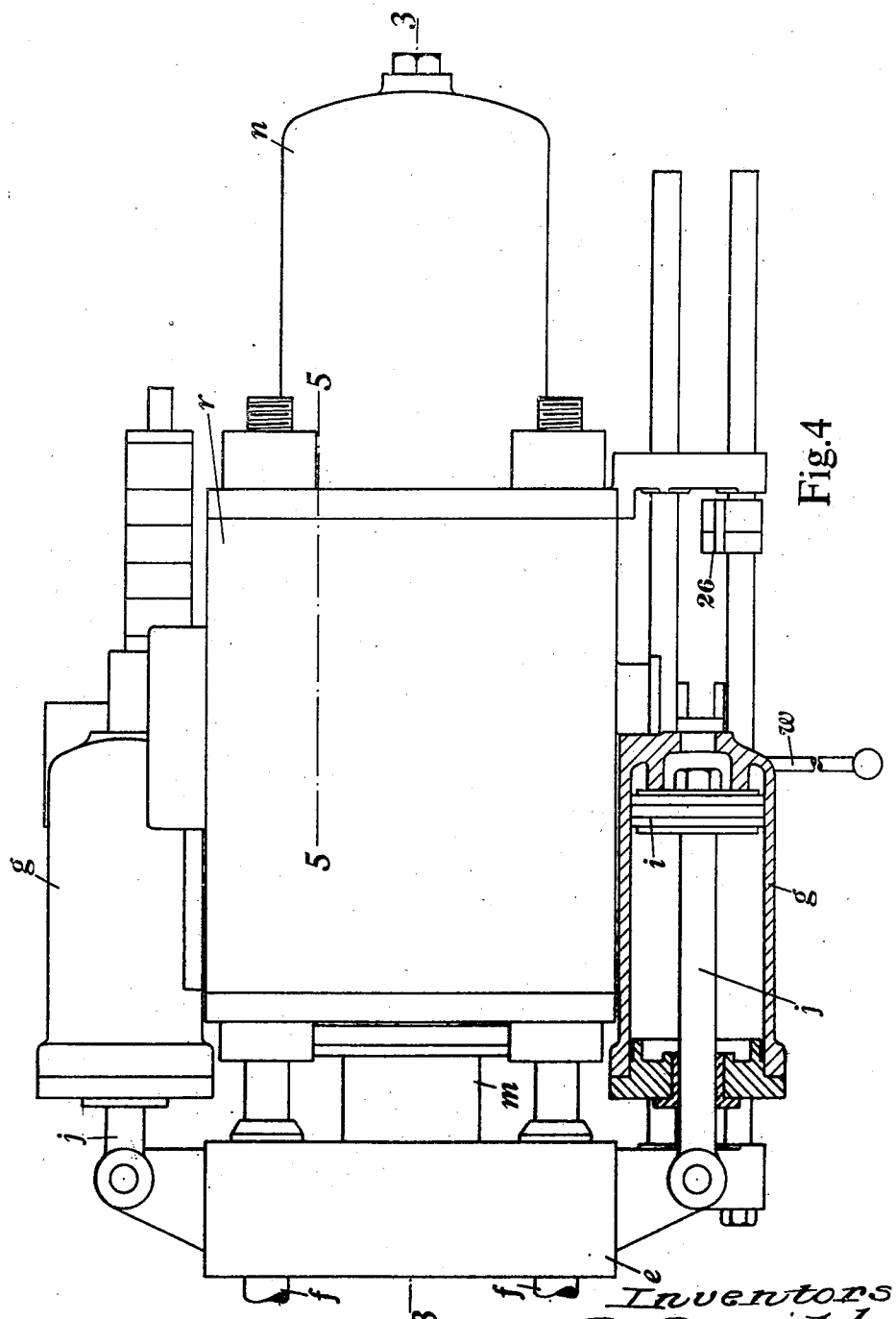

Patented Mar. 12, 1946

2,396,539

UNITED STATES PATENT OFFICE 2,396,539

PRESSURE INTENSIFYING MECHANISM

Stanley Smith and Wilfred Henry Cockerill, West Bromwich, England, assignors to E. M. B. Company Limited, West Bromwich, England Application December 6, 1943, Serial No. 513,118
In Great Britain January 25, 1943

3 Claims. (Cl. 60—54.5)

This invention has for its object to provide an improved machine which may be used for the manufacture of articles from thermo-plastic or thermo-setting materials, and particularly by that type of process known as injection moulding, or for the manufacture of metal articles by die-casting.

In the accompanying sheets of explanatory drawings:

Figure 2 is a front view, Figure 3 a sectional front view, and Figure 4 a part sectional plan, illustrating to a larger scale than Figure 1 the part of the machine shown at the right hand side of the latter figure, Figure 3 being taken on the line 3—3 of Figure 4.

Figure 5 is a fragmentary sectional front view taken on the line 5—5 of Figure 4.

Figure 1:
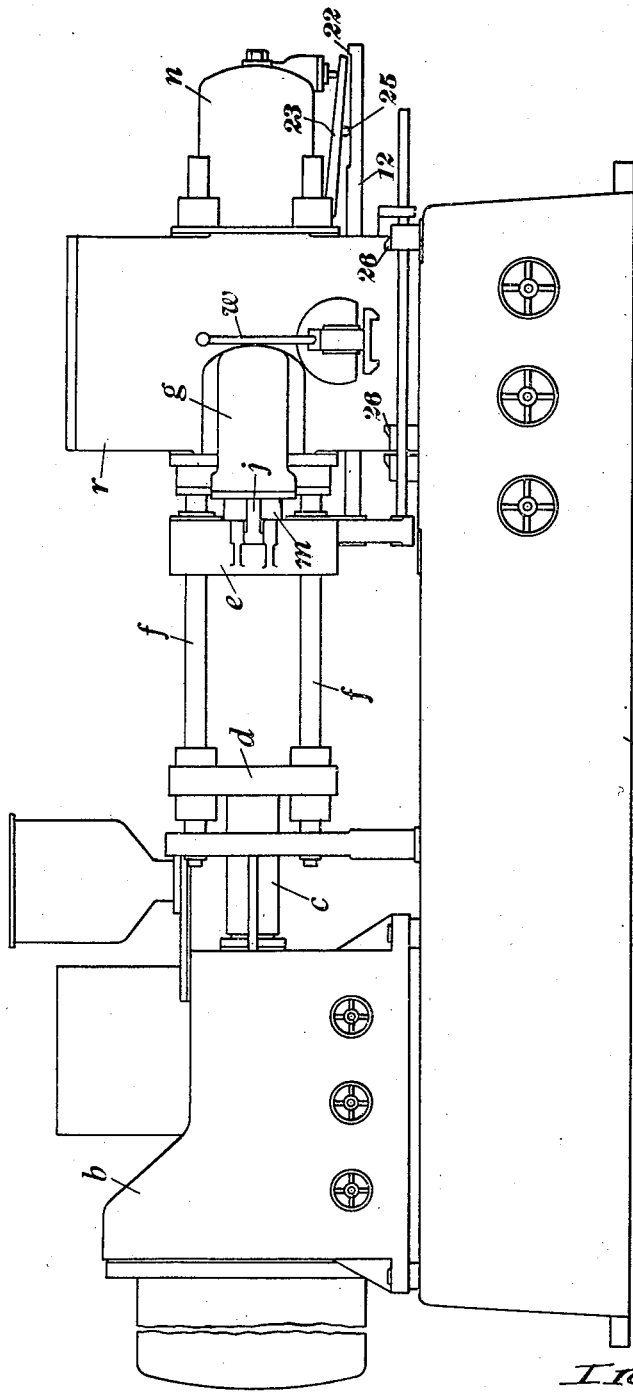
Figure 1 is a front elevation of a horizontal injection moulding machine embodying the invention.

In carrying the invention into effect as shown, we mount at one end of a bed $a$ a housing $b$ containing any convenient receptacle and heating means for the plastic material to be injected. At one end of the housing $b$ is a horizontal cylinder $c$ through which material from the receptacle in the housing can be injected into a mould (not shown), the latter being carried in part by a stationary platen $d$ and in part by a horizontally movable platen $e$. The platens $d$, $e$ are carried by fixed horizontal guides $f$. The movable platen $e$ is actuated by means which constitute the main feature of our invention, and which comprise a pair of stationary operating cylinders $g$ arranged parallel with each other at opposite sides of a stationary control cylinder $h$, the latter being situated coaxially with the horizontal central axis of the machine. Each of the operating cylinders $g$ is provided with a piston as $i$ and the latter is connected to the movable platen $e$ by a piston rod $j$. The motive fluid employed for actuating the pistons $i$ is preferably compressed air, but if desired a liquid under pressure may be used. Also the control cylinder $h$ is provided with a piston $k$ which is connected to the movable platen $e$ by a ram or piston rod $m$. The fluid used in the control cylinder $h$ is oil or any other convenient liquid. Further, we arrange coaxially with and at the rear of the control cylinder $h$ a stationary intensifier cylinder $n$, this being provided with a piston $o$ having extending from it a piston rod $p$ which passes through a gland $q$ in the adjacent end of the control cylinder, the function of this rod being to exert pressure on the liquid at the rear side of the control piston. The fluid used in the intensifier cylinder $n$ is preferably compressed air, though any convenient liquid under pressure may be used if desired.

The mode of action of the platen-actuating means above described is as follows:

Motive fluid admitted to one end of each of the operating cylinders $g$ causes the movable platen $e$ to advance from the retracted position shown towards the stationary platen $d$, and the rate of movement is controlled by the displacement of liquid from the front end of the control cylinder $h$, that is the end nearer to the movable platen, into a reservoir $r$ situated above the control cylinder, this displacement being regulated by a valve $s$. During this action liquid also flows from the reservoir $r$ past another valve $t$ to the rear end of the control cylinder, that is the end remote from the movable platen $e$. When the two mould parts carried by the platens $d$, $e$ are brought together, relatively heavy pressure is required to be exerted on the movable platen $e$ for preventing separation of the mould parts during the injection operation. This pressure is obtained by the admission of compressed air or other motive fluid to the intensifier cylinder $n$, and the pressure exerted on the piston $o$ in this cylinder is transmitted through the rod $p$ to the liquid in the control cylinder $h$ at the rear side of the control piston $k$. A relatively large pressure is thus exerted on the platen through the control cylinder piston rod or ram $m$, and the mould parts are thereby effectively interlocked. To separate the mould parts the pressure fluid is released from the intensifier cylinder $n$, and motive fluid is admitted to the other ends of the operating cylinders $g$, causing the movable platen $e$ to be retracted, the rate of return being controlled if desired by the valve $t$.

By utilising the liquid in the control cylinder $h$ for exerting the required terminal pressure on the movable platen $e$, and by causing the pressure applied to the intensifier piston $o$ to set up the required pressure in this liquid, we are able to obtain the required interlocking of the mould parts prior to the injection operation in a very simple and satisfactory manner.

Figure 6:
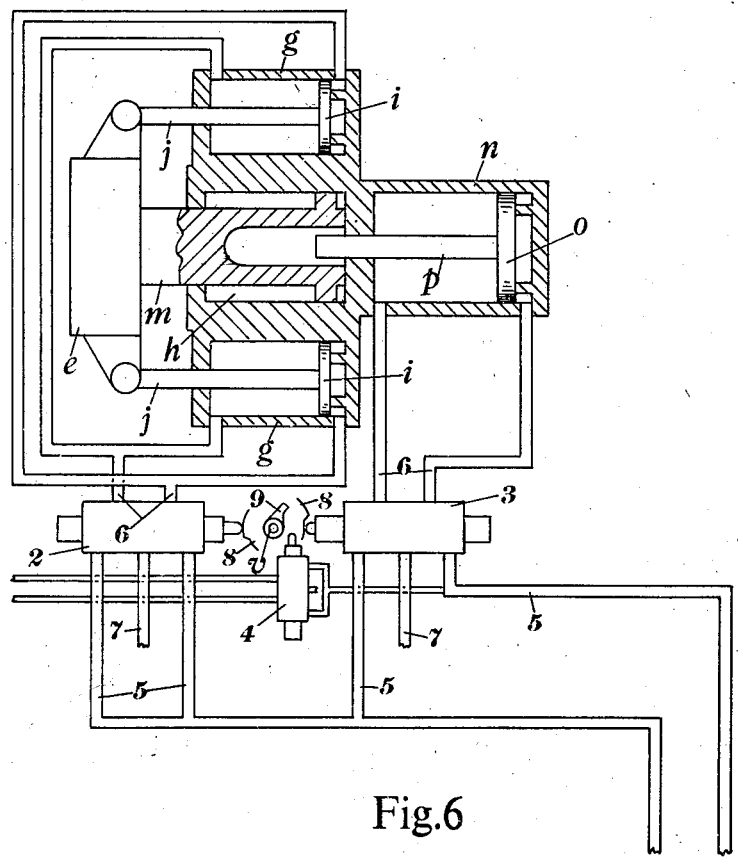
Figure 6 is a diagram illustrating the valve mechanism employed for controlling the flow of fluids to and from the machine shown in Figures 1 to 5.

To effect convenient control of the motive, controlling, and pressure-intensifying fluids we employ the following mechanism which constitutes a further feature of our invention. In any convenient position in association with the control cylinder $h$ we arrange an operating spindle $v$, this being situated beneath and transversely across the control cylinder, and being operable by a hand lever $w$. This spindle $v$ is connected by chain-and-sprocket or other gearing as $x$, with a cam spindle $y$, situated in the liquid reservoir $r$ which surmounts the control cylinder $h$. The cam spindle $y$ serves to actuate through a pair of levers $z$ the valves $s$, $t$ which control communication between the reservoir $r$ and the two ends of the control cylinder $h$. Arranged adjacent to the operating spindle $v$ are spring-loaded valves 2, 3 and 4 (Figure 6). The valve 2 serves to control the flow of motive fluid to and from the operating cylinders $g$. The valve 3 serves to control the flow of motive fluid to and from the intensifier cylinder $n$. The valve 4 serves to control the flow of the motive fluid employed for injecting material into the mould. The valves 2—3 are connected by piping 5 to any convenient source of compressed air or other fluid, and by piping 6 to the parts to be supplied with such fluid, each valve being also provided with a fluid outlet 7. The valves 2 and 3 are operable by a cam or cams as 8 on the operating spindle $v$, and the valve 4 is operable by an arm 9 on this spindle. The cam or cams 8 and arm 9 are shaped and arranged to actuate the corresponding valves 2—4 in the sequence hereinafter described. On the operating spindle $v$ are formed cam-like parts 10, 10ª, which co-operate respectively with a flat 11 on a horizontal slidable rod 12 attached at one end to the movable platen $e$ and with a flat 13 on a spring loaded plunger 14 which is responsive to the liquid pressure in the rear end of the control cylinder $h$, contact of the said cam-like parts and flats serving to impose temporary limits on the amount of movement that can be imparted to the operating spindle. The arrangement is such that an initial angular movement of the operating spindle $v$ by the hand lever $w$ actuates the valve 2 through which motive fluid is admitted to the operating cylinders $g$. A further movement of the operating spindle $v$ causes the valves $s$, $t$ of the control cylinder $h$ to be opened, this movement being terminated by contact of the cam-like part 10 on the spindle $v$ with the flat 11 on the slidable rod 12. The platen $e$ now begins to move, the rate of movement being controlled by the operation of the valve $s$ through which liquid flows from the front end of the control cylinder $h$ to the reservoir $r$. Meanwhile liquid flows from the reservoir $r$ to the rear end of the control cylinder $h$ past the valve $t$. When the platen $e$ reaches the end of its movement a recess 16 in the slidable rod 12 is situated beneath the operating spindle $v$, and permits further movement of the operating spindle to an extent determined by contact of the cam-like part 10ª on the spindle with the flat 13 on the spring-loaded plunger 14. Such further movement of the operating spindle $v$ admits motive fluid to the intensifier cylinder $n$ and closes the valve $t$ at the rear end of the control cylinder. The platen $e$ is now subjected to the heavy pressure required for holding the mould parts together. When the liquid pressure in the rear end of the control cylinder $h$ attains a predetermined amount under the action of the intensifier, the above-mentioned plunger 14 moves under the action of this pressure and brings a recess 15 in the plunger beneath the operating spindle $v$, thus allowing the operating spindle $v$ to be moved still further for actuating the valve 4 which controls the flow of motive fluid employed for injecting the plastic material into the mould. In the reverse movement of the hand lever $w$, the valve 3 is actuated to release the intensifier pressure, the control cylinder valves $s$, $t$ are suitably moved, and the valve 2 is actuated to admit motive fluid to the other ends of the operating cylinders $g$, causing the movable platen $e$ to be retracted to its initial position.

The spring loaded plunger 14 is slidably supported, parallel with the rod 12 in a bore 18 formed in the lower portion of the wall of the control cylinder $h$, one end of the plunger being arranged to extend into the adjacent end of a bush 19 which at a position between its ends communicates through a passage 20 with the rear end of the control cylinder so that the plunger is exposed to the fluid pressure in this end of the control cylinder, the end of the bush remote from the plunger being closed by a vent plug 21.

As the range of movement of the movable platen $e$ may be adjustable, and as it is desirable to prevent risk of operation of the intensifier in the event of improper adjustment of the various parts of the machine, we form or provide on the end of the slidable rod 12 remote from the movable platen an abutment 22 for actuating a lever 23 which can open a relief valve 24 in the intensifier cylinder $n$. The abutment 22 is such that normally it has no effect on the relief valve 24, but in the event of improper adjustment resulting in an excessive movement of the platen $e$, the abutment serves by contact with a projection 25 on the lever 23 to cause the latter to open the relief valve.

The hand lever $w$ may be adapted to co-operate with adjustable abutments 26 in the manner described in British specification No. 547,641.

Whilst the invention is more especially intended for use in injection moulding it may also be applied (with appropriate modification of detail if necessary) to moulding operations on thermo-setting materials, or to metal die casting operations. Also the invention is not limited to the example above described as subordinate details may be varied to suit different requirements. Thus, if desired, a single and axially arranged operating cylinder and piston may be used, but a pair of such cylinders is preferable as it enables a more compact arrangement to be obtained.

Having thus described our invention what we claim as new and desire to secure by Letters Patent is:

1. A moulding or die-casting machine having in combination at least one operating cylinder and piston for actuating a movable platen under the action of fluid pressure, valve mechanism for controlling the flow of fluid to and from the operating cylinder, a hydraulic control cylinder and piston for regulating the rate of movement of the platen, a liquid reservoir associated with the hydraulic control cylinder, valve mechanism for controlling the flow of liquid between the reservoir and opposite ends of the hydraulic control cylinder, an intensifier cylinder and piston adapted to exert under the action of fluid pressure a heavy terminal pressure on the platen through the medium of the liquid in the control cylinder, and valve mechanism for controlling the flow of fluid to and from the intensifier cylinder.

2. A machine as claimed in claim 1, in which an operating cylinder and piston are arranged at each of a pair of opposite sides of the hydraulic control cylinder and piston, the intensifier cylinder and piston are arranged coaxially with the hydraulic control piston and cylinder, and the liquid reservoir is situated above the hydraulic control cylinder.

3. A machine as claimed in claim 1 and having in combination with the intensifier cylinder, a pressure relief valve, and means responsive to movement of the platen, for causing the relief valve to be actuated, said means being arranged so that it has no effect on the relief valve except when the movement imparted to the platen exceeds a predetermined amount.

STANLEY SMITH.
WILFRED HENRY COCKERILL.